July 28, 1959  F. H. GRADY  2,896,470
VEHICLE CONTROLS
Filed July 29, 1957  4 Sheets-Sheet 1

INVENTOR
Francis H. Grady
BY
W. C. Middleton
ATTORNEY

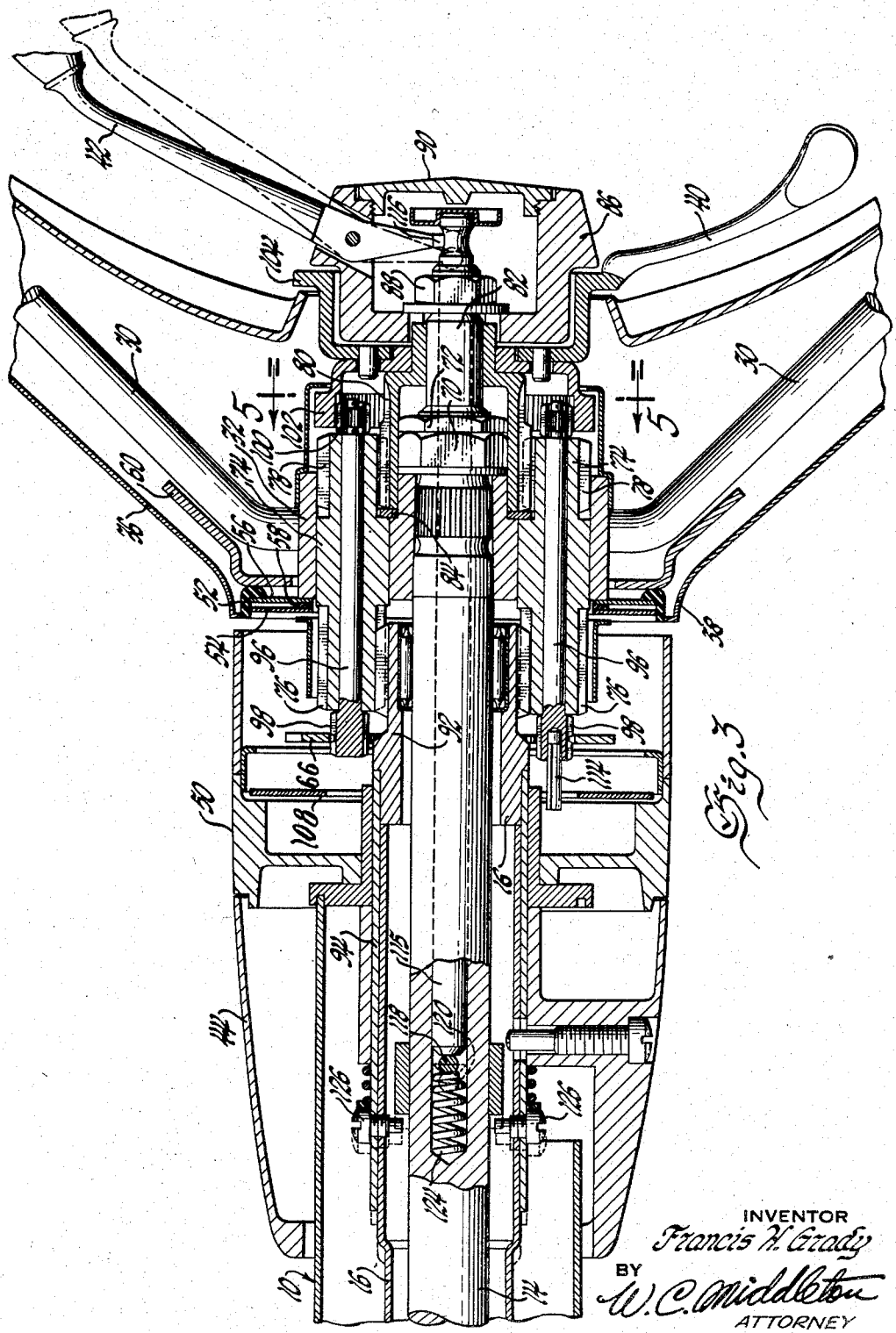

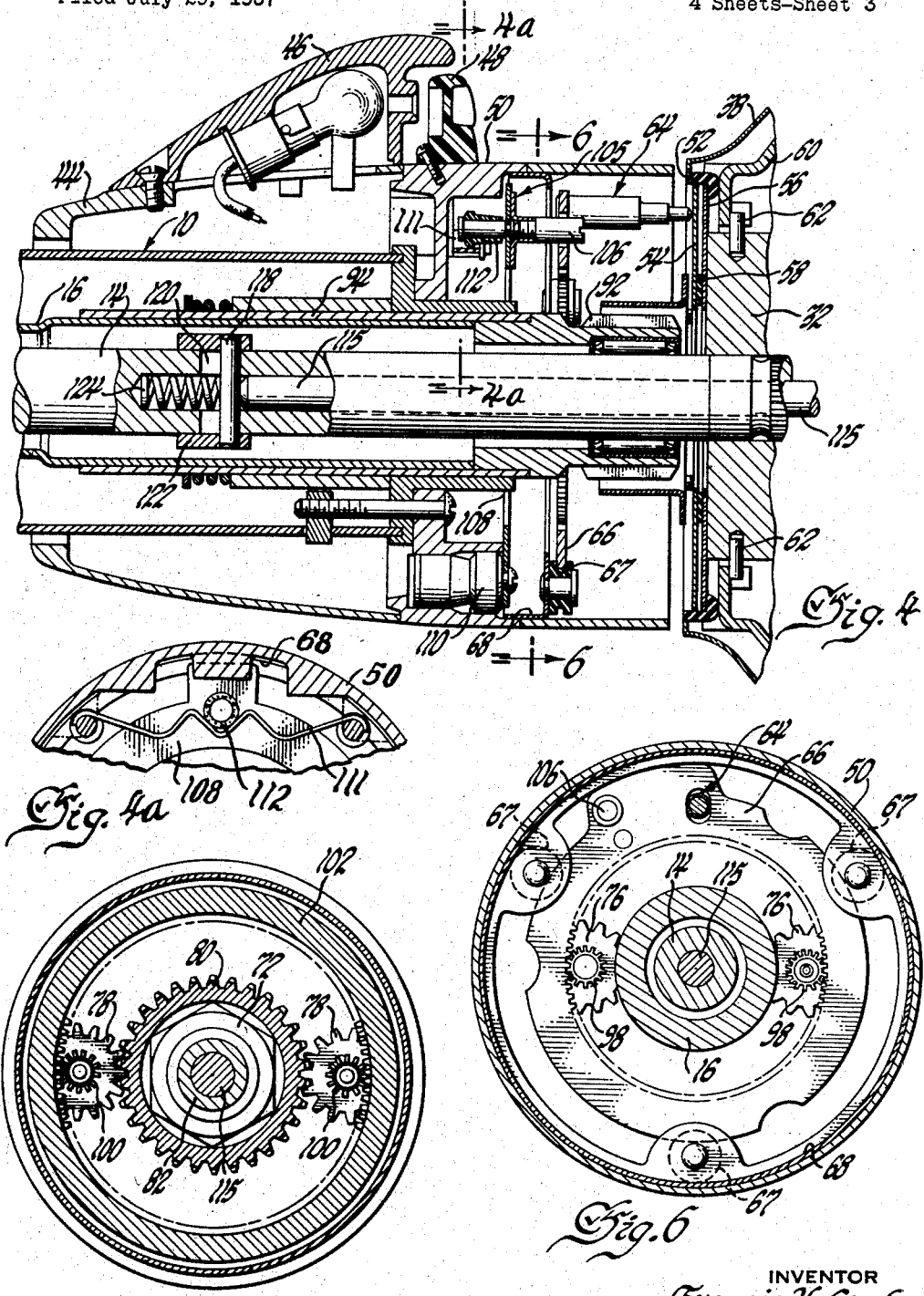

INVENTOR
Francis H. Grady
BY
W. C. Middleton
ATTORNEY

United States Patent Office 2,896,470
Patented July 28, 1959

2,896,470

VEHICLE CONTROLS

Francis H. Grady, Pontiac, Mich., assignors to General Motors Corporation, Detroit, Mich., a corporation of Delaware Application July 29, 1957, Serial No. 674,825

11 Claims. (Cl. 74—484)

This invention relates to motor vehicle controls and particularly to controls of the type adaptable for installation on a vehicle steering column.

Frequently, it is advantageous to position steering column mounted vehicle and vehicle accessory controls above the hub of the steering wheel. In this position, the controls are more accessible to the operator and, also, because openings in the steering column are eliminated, the general appearance is improved. To make such a relocation there is, however, the problem of connecting the control members, which may be in the form of rings or levers, to the associated vehicle control shafts and accessory operating devices. For example, if the steering shaft is housed within a control shaft, then a connection must be made through or around the steering wheel without interfering with the separate operation of the steering wheel or the control member.

With these considerations in mind, the invention contemplates positioning vehicle and vehicle accessory controls of the type suited for installation on a vehicle steering column above a hub portion of the steering wheel and by novel means interconnecting through the steering wheel these controls with appropriate control shafts and accessory operating devices without interfering with the independent operation of the steering wheel and the controls.

By the invention, it is proposed to intergear, in a unique way through the steering wheel, controls of the foregoing character and components mounted about and below the steering wheel hub.

Specifically, the invention provides planetary gearing for interconnecting, through a steering wheel, vehicle and accessory controls positioned above a hub portion of the steering wheel with cooperating control shafts and accessory operating devices. By utilizing planetary gearing, the controls may be operated separately or jointly without either interfering with the other or interrupting conventional turning of the steering wheel.

Another aim of the invention is to provide a means for preventing rotation of the controls to a particular setting until the control is moved in a predetermined manner. In particular, a stop arrangement is furnished for restraining rotation of the transmission control to park position which stop can be bypassed only by pivotal rotary movement of the transmission control.

In carrying out the invention according to one form thereof, a transmission control shaft is mounted for axial and rotatable movement within a steering column. A steering shaft is positioned within the transmission control shaft and has a hub portion of the steering wheel attached to its upper end. An accessory operating device is mounted on the steering column below the hub of the steering wheel while an accessory control member and also a transmission control member are positioned above the hub of the steering wheel. Planetary gearing is utilized for interconnecting the accessory control member with the accessory operating device and the transmission control member with the transmission control shaft through the hub of the steering wheel. To accomplish this, two planetary gear sets are employed, each having spaced planet pinions journaled on the steering wheel hub, which hub functions as a planet carrier. A pinion is positioned on each side of the hub so that a gear connected to the transmission control member will engage the pinion on one side of the hub and a gear connected to the transmission control shaft will engage the pinion on the other side of the hub. Therefore, with the transmission control shaft maintained in a particular setting, rotation of the steering wheel will not interfere with this setting nor will operation of the transmission control member conflict with the steering. Similarly, the accessory operating device has a gear connected thereto which engages a pinion on one side of the hub and the accessory control member is connected to another gear engaging the pinion on the opposite side of the hub. In a manner like that of the transmission control member, the accessory control member can be rotated to manipulate the accessory operating device.

The transmission control member is both mounted for rotatable movement and pivotal movement wtih the pivotal movement being transferred through a rod and a sleeve, slidable on the steering shaft, to abutments on the transmission control shaft. Consequently, the transmission control shaft is shifted axially so that a stop on the steering column is cleared and the transmission control member can be rotated to the park position without further restraint.

The foregoing and other objects and advantages will be apparent from the following description and the accompanying drawings in which:

Figure 3 is a sectional view along the line 3—3 of Figure 1;

Figure 4 is a sectional view along line 4—4 of Figure 2;

Figure 4a is a fragmentary sectional view along line 4a—4a of Figure 4.

Figure 5 is a sectional view along line 5—5 of Figure 3;

Figure 6 is a sectional view along line 6—6 of Figure 4;

Figure 1:
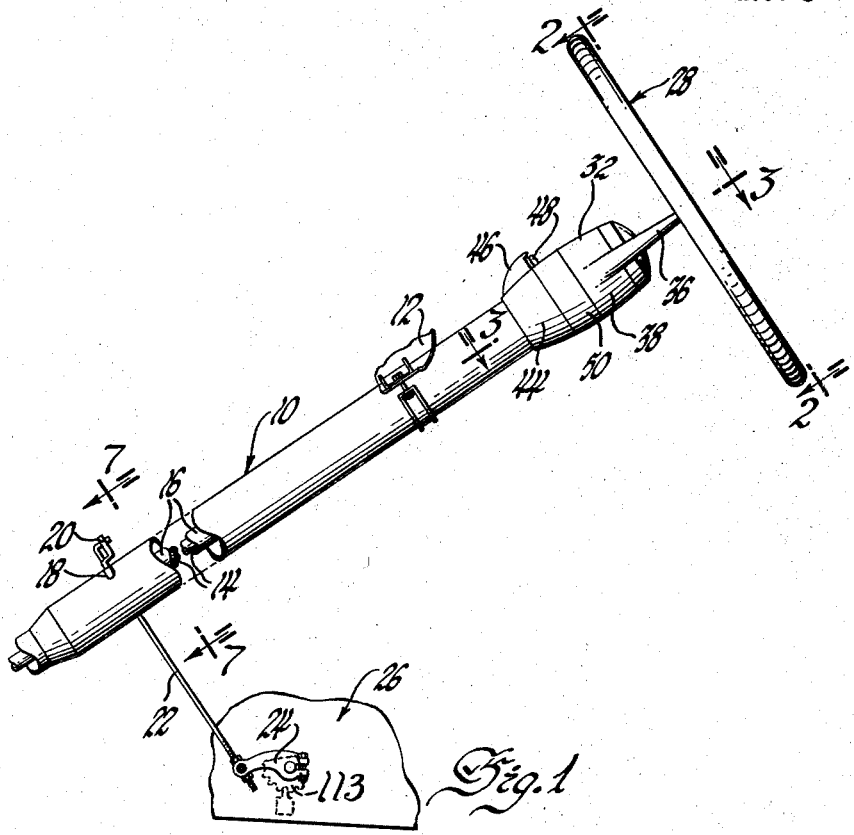
Figure 1 is an elevational view of an embodiment of the invention.
Figure 2:
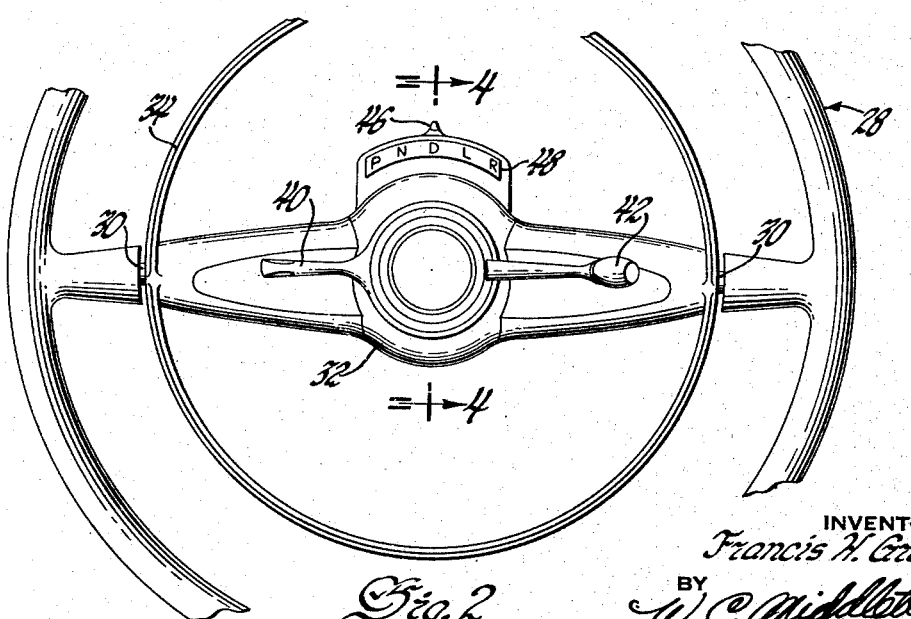
Figure 2 is a plan view of a steering wheel looking in the direction of arrows 2—2 of Figure 1 demonstrating the arrangement of vehicle and vehicle accessory controls.

Referring to Figure 1, numeral 10 indicates a steering column which is suitably mounted on a vehicle frame (not shown) by a bracket 12. Rotatably mounted within the steering column 10 is a steering shaft 14 and a hollow transmission control shaft 16 with the steering shaft 14 disposed within the hollow transmission control shaft.

Figure 7:
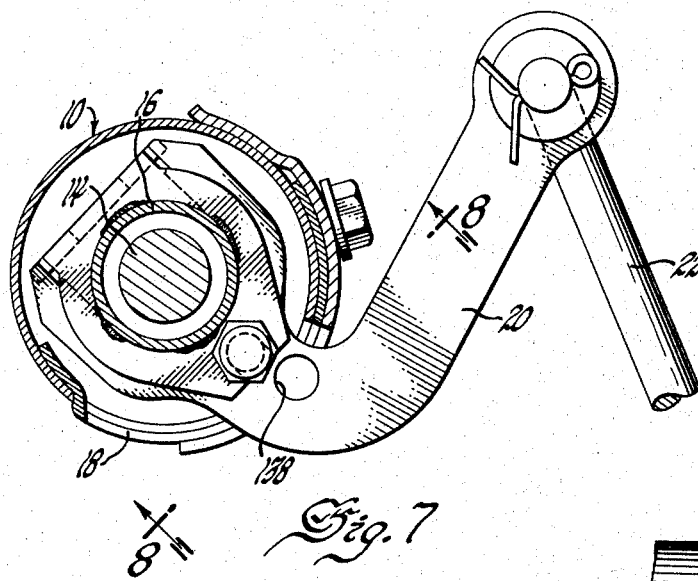
Figure 7 is a sectional view along line 7—7 of Figure 1.
Figure 8:
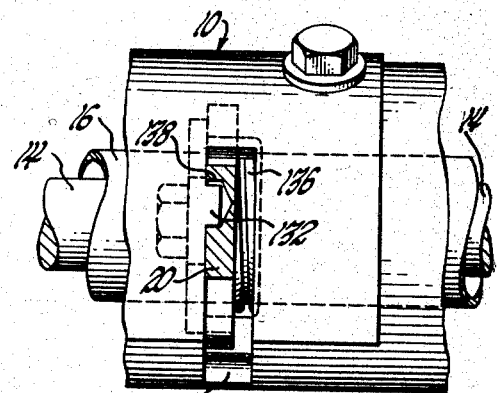
Figure 8 is a fragmentary elevational view looking in the direction of arrows 8—8 of Figure 7.

At the bottom end of the steering column, a peripheral slot 18 is afforded in the column through which extends a side arm 20. The inside of the arm 20 is attached to the transmission control shaft 16, as viewed in Figure 7, while the outside part of the arm is connected through a link 22 with an external lever 24 mounted on the transmission 26. Maneuvering of the lever 24 changes the transmission settings in a manner well known.

At the upper end of the steering column 10, a steering wheel 28 is positioned which has a pair of oppositely disposed depending spokes 30 terminating in a hub 32.

Concentric with the steering wheel 28 is a horn ring 34 with arms 36 enclosing the spokes 30 on the wheel and which arms are integral with or otherwise secured to an upper shroud 38. Within the space defined by the horn ring 34 an accessory control member, such as a direction signal switch lever 40, and a vehicle control member, e.g., transmission control lever 42, are disposed above the steering wheel hub 32 for rotation about the axis of the horn ring 34 and the steering wheel 28. The transmission control lever 42 rotates, as will be explained, a lower shroud 44 on which is mounted a transmission setting pointer 46. This pointer 46 is adjacent a transmission setting indicator 48 attached to an intermediate shroud 50 fixedly supported by the steering column 10. When the transmission control lever 42 is rotated the pointer 46 will move opposite the various transmission settings indicated on the segment 48 preparing the transmission for whatever condition the vehicle operator desires.

The upper shroud 38, which forms a part of the horn ring 34, has connected thereto (see Figures 3 and 4) an annular support ring 52 of insulating material which ring is supported on spaced metallic plates 54 and 56. These plates 54 and 56 are separated by an insulating washer 58 and are affixed along with the washer 58 to the hub 32. An annular metallic strip 60 on the inside of the shroud 38 is interposed between the ring 52 and a series of pivot pins 62. On the opposite side of the ring 52, a spring actuated plunger 64 is in engagement with the plate 54 and is mounted on a ring gear 66, in turn, rotatably mounted by a series of rollers 67 on a support sleeve 68 within the fixed shroud 50. The spring actuated plunger 64 has a suitable electrical connection with a horn operating device (not shown), so that, when the horn ring 34 is depressed, the upper shroud 38 is pivoted about one of the pivot pins 62 and forces the spaced plates 54 and 56 into contact. As a result, an electrical circuit is completed to ground from the horn operating device through the spring actuated plunger 64, plates 54 and 56, the hub 32, steering shaft 14, to the vehicle frame. The completed circuit from the customary vehicle battery (not shown) will energize the horn operating device in a well known manner.

The hub 32 of the steering wheel 28 is press fitted or otherwise secured to the upper end of the steering shaft 14 and positioned axially by a nut 70 and a lock nut 72, each threaded on the shaft 14. A plurality of hollow pinion shafts 74 are rotatably supported within bores in the hub 32 which performs as a planet carrier. Pinions 76 and 78 are preferably formed integral with the shaft 74 at the opposite ends thereof; hence, the outside diameters of the pinions 76 and 78 are made smaller than the inside diameter of the bores in the hub 32 in which they fit. Although this one-piece structure has advantages, of course, the pinions 76 and 78 may, of course, be attached as separate gears to the pinion shaft 74. A sun gear 80 is rotatably mounted on a reduced portion 82 of the steering shaft 14 and intermeshes with the pinion gear 78. The sun gear 80 and the pinion shaft 74 are positioned axially by a retaining ring 84 interposed therebetween. A cup shaped member 86 is drive connected as by splines or the equivalent to the sun gear 80 and is positioned axially by a lock nut 88 threadedly engaged with the extreme upper end of the steering shaft 14. Pivotally supported on the cup shaped member 86 is the transmission control lever 42. A button 90 is attached to the member 86 closing the opening therein. On the opposite side of the hub 32, the pinion 76 is in engagement with another sun gear 92 which is rotatably supported on the steering shaft 14 and which is connected to the transmission control shaft 16 by a sleeve 94.

Rotatably disposed within the hollow pinion shafts 74 are pinion shafts 96 to each of which is attached or made integral therewith at one end pinions 98 and affixed to the opposite end pinions 100. Pinions 100 engage a ring gear 102, revolvably mounted on the sun gear 80. The gear 102 is connected to a recessed cup 104 which includes the direction signal switch operating lever 40. Pinions 98 engage the ring gear 66 and rotate the direction signal switch, indicated generally at 105 in Figure 4. The switch 105 which is housed within the fixed shroud 50, may be similar to that disclosed in the application of William E. Brown and Ward Cole, S.N. 444,068, now Patent No. 2,800,541, filed July 19, 1954, for a Direction Signal Switch. Briefly, rotation of the ring gear 66 will, through a drive pin 106, revolve a switch operating ring 108 pivotally mounted at 110 on the fixed shroud 50. The switch operating ring 108 is retained in either the left turn, right turn or neutral position by the engagement of a detent spring 111 (see Figure 4a which illustrates the neutral position) with the pin end 112 and in either the left turn or right turn position will render operative an electrical circuit to the appropriate turn signal lights (not shown). A cancelling pin 114 is installed to the end of the pinion shaft 96 and engages with the switch operating ring 108 in a manner that rotation of the steering wheel will cause the cancelling pin to revolve the switch operating ring 108 back to the neutral position from either the left or right turn signal setting.

The operation of the planetary gearing is such that with the transmission control shaft 16 retained in one of the transmission settings by a suitable detent means 113 within the transmission 26, the steering wheel 28 can be rotated which will carry the pinion shaft 74 with it, but, since the sun gear 92 is restrained from rotation, the opposite sun gear 80 will also be prevented from rotation. Consequently, the transmission control lever 42 will remain in the selected transmission setting position. During rotation of the hub 32, the pinions 76 and 78 will simply walk around the stationary sun gears 92 and 80 without transferring any drive thereto. When the operator wishes to change the transmission setting, then the lever 42 is rotated which through the sun gear 80 will revolve the pinions 78 and, accordingly, the shaft 74 and pinions 76. This rotation is transferred to the sun gear 92, the transmission control shaft 16 and to side arm 20 whereupon the link 22 actuates the external lever 24, and overcomes the detent means 113 resetting the transmission 26.

The direction signal switch 105 is actuated similarly to the transmission control shaft 16. With the ring gear 66 held in either the left turn, right turn or neutral position by the detent spring 111 which holds the switch operating ring 108, the pinions 98, pinion shaft 96 and, as a result, the pinions 100 are prevented from rotation as is the direction signal switch lever 40. Therefore, rotation of the hub 32 will cause the pinions 98 and 100 to walk around the stationary ring gears 66 and 102 without imparting any driving force thereto. As mentioned, when the steering wheel 28 is rotated, assuming the direction signal switch 105 is in either the left or right turn position, the cancelling pin 114 will be carried around with the pinion shaft 98 and hub 32 during rotation of the steering wheel 28 until the cancelling pin rotates the switch operating ring 108 back to the neutral position where it will remain until the direction signal switch lever 40 is again operated.

As can be seen, both the direction signal switch lever 40 and the transmission control lever 42 are rendered more accessible to the operator. Furthermore, these levers 40 and 42 may be operated separately or together without interfering with rotation of the steering wheel 28 nor will the rotation of the steering wheel interfere with the operation of either of the levers 40 or 42.

Figure 9:
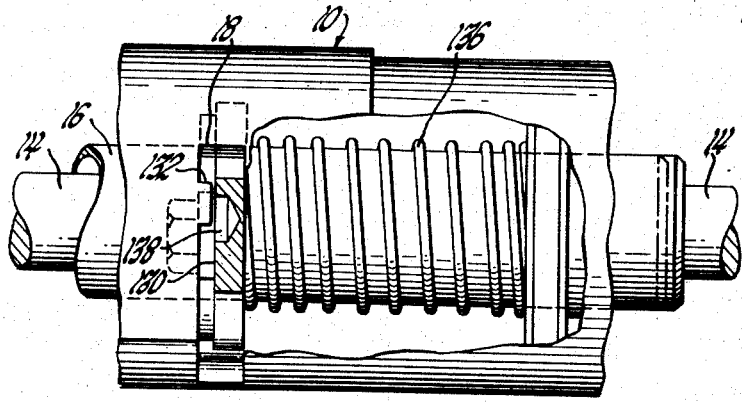
Figure 9 is a fragmentary elevational view similar to Figure 8.

To prevent the transmission control lever 42 from being inadvertently placed in the park position with the vehicle in motion, an actuating rod 115 is slidably positioned within the upper end of the steering shaft 14, The upper end of the rod 115 has a socket connection at 116 with the lever 42 while the opposite end of the rod engages a cross pin 118 extending through slots 120 in the shaft 14. This cross pin 118 is connected to a transfer sleeve 122 which is slidable on the shaft 14. A spring 124 normally urges the transfer sleeve 122 and the rod 115 to the position demonstrated. When the lever 42 is moved upwardly to the dotted line position, the actuating rod 115 moves downwardly carrying with it the transfer sleeve 122 whereupon the transfer sleeve will engage the shoulder screws 126 attached to the transmission control shaft 16. As a result, the transmission control shaft 16 and side arm 20 are moved downwardly (to the right as viewed in Figure 9) to allow a surface 130 on the side arm 20 to pass by a stop extension 132 along the side of the slot 18 in the steering column. The transmission control shaft 16 then can be rotated until an opening 138 is over the stop extension 132 whereupon, when the manual lever 42 is released, a spring 136 will force the opening to engage the stop extension 132 and maintain the park position setting. When it is desired to rotate the transmission control lever 42 out of the park position, then it is again raised so that the opening 138 will be disengaged from the stop extension 132 freeing the control shaft 16 for rotation.

What is claimed is:

1. In combination with a vehicle steering column, a vehicle accessory operating device mounted on the steering column, vehicle control and steering shafts rotatably supported by the steering column, vehicle and accessory control members positionable in a plurality of settings, a steering wheel including a hub portion secured to the steering shaft between an end of the steering column and the vehicle and accessory control members, and gearing means for drive connecting both the vehicle control member with the vehicle control shaft and the accessory control member with the accessory operating device through the steering wheel to permit independent movement of the steering shaft relative to the vehicle control shaft and the accessory operating device.

2. In combination with a vehicle steering column, a vehicle accessory operating device mounted on the steering column, vehicle control and steering shafts rotatably supported by the steering column, vehicle and accessory control members positionable in a plurality of settings, a steering wheel including a hub portion secured to the steering shaft between an end of the steering column and the vehicle and accessory control members, and planetary gearing means for drive connecting both the vehicle control member with the vehicle control shaft and the accessory control member with the accessory operating device through the steering wheel to permit independent movement of the steering shaft relative to the vehicle control shaft and the accessory operating device.

3. In combination with a vehicle steering column, an accessory operating device mounted on the column, transmission control and steering shafts rotatably supported by the steering column, the steering shaft being disposed within the transmission control shaft, rotatably mounted transmission and accessory control members positionable in a plurality of settings, a steering wheel including a hub portion secured to the steering shaft between an end of the steering column and the transmission and accessory control members, and planetary gearing means for interconnecting through the steering wheel both the transmission control member with the transmission control shaft and the accessory control member with the accessory operating device to permit independent movement of the steering shaft relative to the transmission control shaft and the accessory operating device.

4. In combination with a vehicle steering column, an accessory operating device mounted on the column, transmission control and steering shafts rotatably supported by the steering column, the steering shaft being disposed within the transmission control shaft, rotatably mounted transmission and accessory control members positionable in a plurality of settings, a steering wheel, including a hub portion secured to the steering shaft between an end of the steering column and the transmission and accessory control members, and planetary gearing drive connecting through the steering wheel both the transmission control member with the transmission control shaft and the accessory control member with the accessory operating device to permit independent movement of the steering shaft relative to the transmission control shaft and the accessory operating device.

5. In combination with a vehicle steering column, an accessory operating device mounted on the column, transmission control and steering shafts rotatably supported by the steering column, transmission and accessory control members positionable in a plurality of settings, a steering wheel including a hub portion secured to the steering shaft between an end of the steering column and the transmission and accessory control members, and planetary gearing for interconnecting through the steering wheel both the transmission control member with the transmission control shaft and the accessory control member with the accessory operating device to permit independent movement of the steering shaft relative to the transmission control shaft and the accessory operating device, the planetary gearing including first and second gear sets each comprising an input gear, an output gear, a pinion shaft journaled on the steering wheel and rotatable therewith, and a pinion attached to each end of the shaft, one of the pinions engaging the input gear and the other pinion engaging the output gear, the input and output gears for the first planetary gear set being rotatable, respectively, with the transmission control member and the transmission control shaft, and the input and output gears for the second planetary gear set being rotatable, respectively, with the accessory control member and the accessory operating device.

6. In combination with a vehicle steering column, an accessory operating device mounted on the column, transmission control and steering shafts rotatably supported by the steering column, transmission and accessory control members positionable in a plurality of settings, a steering wheel including a hub portion secured to the steering shaft between an end of the steering column and the transmission and accessory control members, and planetary gearing for interconnetcing through the steering wheel both the transmission control member with the transmission control shaft and the accessory control member with the accessory operating device to permit independent movement of the steering shaft relative to the transmission control shaft and the accessory operating device, the planetary gearing including first and second gear sets each comprising an input gear, an output gear, a pinion shaft journaled on the steering wheel and rotatable therewith, and a pinion attached to each end of the shaft, one of the pinions engaging the input gear and the other pinion engaging the output gear, the pinion shaft of each gear set being axially aligned with one rotatably supported within the other, the input and output gears of the first planetary gear set being rotatable, respectively, with the transmission control member and the transmission control shaft, the input and output gears of the second planetary gear set being rotatable respectively with the accessory control member and the accessory operating device.

7. In combination with a steering column, an accessory operating device mounted on the column, transmission control and steering shafts rotatably supported by the steering column, the steering shaft being disposed within the transmission control shaft, transmission and accessory control members positionable in a plurality of settings, a steering wheel including a hub portion secured to the steering shaft between an end of the steering column and the transmission and accessory control members, and planetary gearing for interconnecting through the steering wheel both the transmission control member with the transmission control shaft and the accessory control member with the accessory operating device to permit independent movement of the steering shaft relative to the transmission control shaft and the accessory operating device, the planetary gearing including first and second gear sets, the first gear set comprising a pair of sun gears, one of the sun gears being rotatable with the transmission control member and the other being rotatable with the transmission control shaft, a planet carrier shaft journaled on the steering wheel hub, a pinion attached to each end of the planet carrier shaft, each of the pinions engaging one of the sun gears to transfer rotation of the transmission control shaft member through the steering wheel hub to the transmission control shaft, the second gear set comprising a pair of ring gears, one of the ring gears being rotatable with the accessory control member and the other being rotatable with the accessory operating device, a pinion shaft journaled within the first gear set planet carrier shaft, a pinion attached to each end of the pinion shaft, each of the pinions engaging one of the ring gears to transfer rotation of the accessory control member through the steering wheel hub to the accessory operating device.

8. In combination with a vehicle steering column, a vehicle direction signal switch operating device mounted on the column, transmission control and steering shafts rotatably supported by the steering column, the steering shaft being disposed within the transmission control shaft, transmission control and direction signal switch control members positionable in a plurality of settings, a steering wheel including a hub portion secured to the steering shaft between an end of the steering column and the transmission control and direction signal switch control members, and planetary gearing for interconnecting through the steering wheel both the transmission control member with the transmission control shaft and the direction signal switch control member with the direction signal switch operating device to permit independent movement of the steering shaft relative to the transmission control shaft and a direction signal switch device, the planetary gearing including first and second gear sets, the first gear set comprising a pair of sun gears, one of the sun gears being rotatable with the transmission control member and the other being rotatable with the transmission control shaft, a planet carrier shaft journaled on the steering wheel hub, a pinion attached to each end of the planet carrier shaft, each of the pinions engaging one of the sun gears to transfer rotation of the transmission control member through the steering wheel hub to the transmission control shaft, the second gear set comprising a pair of ring gears, one of the ring gears being rotatable with the direction signal switch control member and the other being rotatable with the direction signal switch operating operating device, a pinion shaft journaled within the first gear set planet carrier shaft, a pinion attached to each end of the pinion shaft, each of the pinions engaging one of the ring gears to transfer rotation of the direction signal control member through the steering wheel hub to the direction signal switch operating device.

9. In combination with a vehicle steering column, transmission control and steering shafts rotatably supported by the steering column, the steering shaft being disposed within the transmission control shaft, a rotatably and pivotally mounted transmission control member positionable in a plurality of transmission settings including a park position, a steering wheel including a hub portion secured to the steering shaft between the end of the steering column and the transmission control member, planetary gearing for interconnecting through the steering wheel the transmission control member with the transmission control shaft to permit independent movement of the steering shaft relative to the transmission control shaft, stop means for preventing rotation of the transmission control member to the park position, and means actuated by pivotal movement of the transmission control member for rendering the stop means ineffective so as to allow rotation of the transmission control member to the park position.

10. In combination with a vehicle steering column, a hollow transmission control shaft mounted with the steering column for axial and rotatable movement relative thereto, a rotatably and pivotally mounted transmission control member positionable in a plurality of transmission settings including a park position, a steering shaft rotatably mounted within the transmission control shaft, a steering wheel including a hub portion secured to the steering shaft between an end of the steering column and the transmission control member, planetary gearing for interconnecting through the steering wheel the transmission control member and the transmission control shaft to permit independent rotation of the steering shaft relative to the transmission control shaft, a stop on the steering column for preventing rotation of the transmission control shaft by the transmission control member to the park position, and means actuated by pivotal movement of the transmission control member for shifting the transmission control shaft axially to allow rotation thereof around the stop to the park position.

11. In combination with a vehicle steering column, a hollow transmission control shaft mounted within the steering column for axial and rotatable movement relative thereto, a rotatably and pivotally mounted transmission control member positionable in a plurality of transmission settings including a park position, a steering shaft rotatably positioned within the transmission control shaft, a steering wheel including a hub portion secured to the steering shaft between an end of the steering column and the transmission control member and planetary gearing for interconnecting through the steering wheel the transmission control member with the transmission control shaft to permit independent movement of the steering shaft relative to the transmission control shaft, the planetary gearing comprising input and output gears rotatable, respectively, with the transmission control member and the transmission control shaft, a pinion shaft journaled on the steering wheel hub, a pinion attached to each end of the shaft, one of the pinions engaging the input gear and the other engaging the output gear, a stop on the steering column for preventing rotation of the transmission control shaft by the transmission control member to the park position, a rod mounted within the steering shaft and connected to the transmission control member for sliding movement relative to the transmission control shaft upon pivotal movement of the transmission control member, a transfer sleeve slidable on the steering shaft by the rod, an abutment on the transmission control shaft adjacent the transfer sleeve, pivotal movement of the transmission control member causing the rod to move the transfer sleeve into engagement with the abutment and shift the transmission control shaft axially to permit rotation of the transmission control shaft by the transmission control member around the stop to the park position.

References Cited in the file of this patent

UNITED STATES PATENTS

| | | |
|---|---|---|
| 931,770 | Krause | Aug. 24, 1909 |
| 2,497,930 | Creson | Feb. 21, 1950 |